Nov. 30, 1965 R. DALLY 3,220,738

METHOD AND APPARATUS FOR MOUNTING THE NEEDLE-CARRYING MEMBER OF A PHONOGRAPH STYLUS ASSEMBLY

Original Filed July 23, 1962

INVENTOR:
ROY DALLY,

BY Norman C. Fulmer
HIS ATTORNEY.

United States Patent Office 3,220,738
Patented Nov. 30, 1965

3,220,738

METHOD AND APPARATUS FOR MOUNTING THE NEEDLE-CARRYING MEMBER OF A PHONOGRAPH STYLUS ASSEMBLY

Roy Dally, Warrensburg, Ill., assignor to General Electric Company, a corporation of New York Continuation of application Ser. No. 211,792, July 23, 1962. This application Apr. 19, 1965, Ser. No. 452,444
3 Claims. (Cl. 274—37)

The present invention is a continuation of my copending application Serial No. 211,792, filed July 23, 1962, now abandoned, for Attachment of a Needle-Carrying Member in a Phonograph Stylus Assembly.

This invention relates to phonograph stylus assemblies, and particularly to an improved arrangement for mounting or attaching a needle-carrying member thereof such as an armature. The invention is an improvement in the stylus assembly structure disclosed and claimed in Patent 3,062,925, issued November 6, 1962, and assigned to the same assignee as is the present invention.

The type of stylus assembly structure to which the invention relates comprises a needle-carrying member that is resiliently attached to a body member by means such as blocks of resilient material. This resilient attachment has a great effect on performance characteristics of the stylus assembly such as compliance, frequency response, and channel separation if used for playing stereo records. The resilient attachment of the needle-carrying member must be sufficiently stable to reliably restore and maintain the needle-carrying member at its neutral or rest position.

An object of the invention is to provide an improved phonograph stylus assembly.

Another object is to provide a stylus assembly structure which is relatively easy to manufacture.

A further object is to provide a stylus assembly structure in which the needle-carrying member is accurately positioned.

A still further object is to provide an improved method and structure for attaching a needle-carrying member to the body member of a stylus assembly.

Still other objects will be apparent from the following description and claims, and from the drawing in which:

Figure 1:
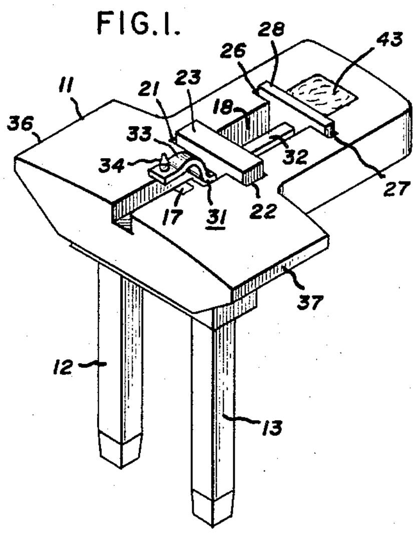
FIG. 1 is a perspective view of a stylus assembly in accordance with a preferred embodiment of the invention, looking generally toward the bottom or stylus-carrying part thereof.
Figure 2:
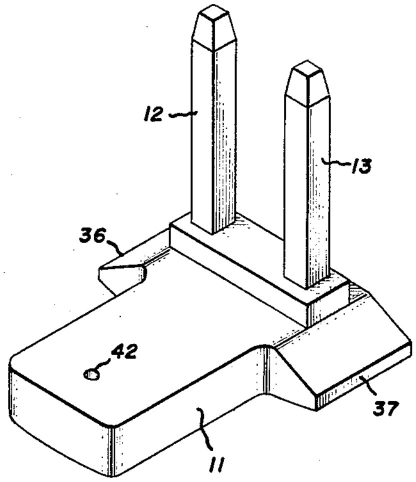
FIG. 2 is a perspective view of the preferred embodiment of the invention, looking generally toward the top thereof.

The invention comprises, basically and in its preferred embodiment, a body member provided with an elongated slot therein. One or more damping blocks are positioned to extend across the slot in the body member. A needle-carrying elongated member extends through openings in the damping blocks so as to be held by the damping blocks. A moldable rubber-like material fills at least a portion of the slot in the body member and engulfs at least the end portion of the needle-carrying member. The objects of the invention are achieved by the aforesaid use of the moldable rubber-like material.

Now referring to the drawing, the preferred embodiment of the stylus assembly comprises a body member 11 preferably made from electrically insulative material such as plastic. A pair of magnetic cores 12 and 13 are carried by the body member 11, extend therefrom in a mutually parallel relationship and are adapted to be inserted into coils of a pickup cartridge as is described in the aforementioned Patent 3,062,925. Within the body member 11, the cores 12 and 13 curve toward each other, the inner ends thereof providing pole pieces 16 and 17 spaced apart to provide a gap therebetween.

Figure 3:
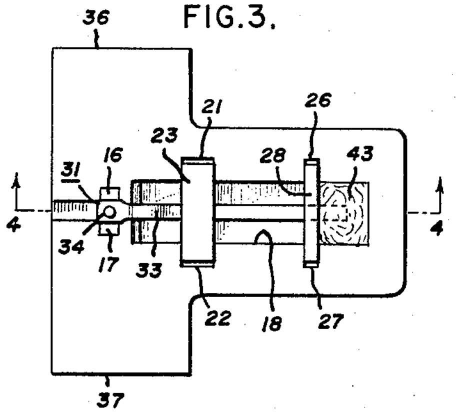
FIG. 3 is a bottom view of the preferred embodiment of the invention.

An elongated slot 18 is provided in the body member 11 behind and in alignment with the pair of pole pieces 16 and 17 (as shown in FIG. 3). A first pair of notches 21, 22 are laterally disposed in the sides of the slot 18, and a first mounting block 23 of resilient material is positioned in the notches 21, 22 and extends across the slot 18. A second pair of notches 26, 27 are laterally disposed in the sides of the slot 18, and a second mounting block 28 of resilient material is positioned in these notches and extends across the slot 18. Preferably, the blocks 23 and 28 are made from butyl rubber or natural gum rubber; and one block may be of one of these materials and the other block may be of the other material.

The notches 21, 22, 26 and 27 provide proper longitudinal positioning of the mounting blocks 23, 28 in the slot 18, and at the same time hold or aid in holding the mounting blocks in place. The mounting blocks 23, 28 may be secured to the body member 11 by means of cement or adhesive where they engage the notches.

An elongated member 31, which may be an armature made from magnetically conductive material and crank-shaped as shown, has an elongated arm portion 32 extending through openings in the mounting blocks 23 and 28. The armature 31 further has a crank portion 33 extending below and symmetrically disposed with respect to the gap between the pole pieces 16, 17, as shown. A needle or stylus 34, adapted for engaging the groove of a phonograph record, is attached to and extends laterally outwardly from the crank portion 33 of the armature 31. The rear end of the arm portion 32 extends behind the rear mounting block 28 and into the partially enclosed space defined by the rear block 28 and the rear portion of the slot 18. However, the rear end of the arm portion 32 is spaced from and does not touch the rear end of the slot 18.

The body member 11 extends laterally outwardly at opposite sides thereof to provide finger-gripping portions 36 and 37 to facilitate manual gripping of the stylus assembly for insertion into and removal from a pickup cartridge.

Figure 4:
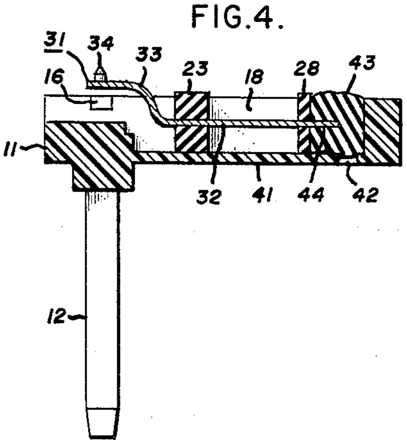
FIG. 4 is a cross-sectional view taken on the line 4—4 of FIG. 3.

As is shown clearly in FIG. 4, the slot 18 has a bottom wall 41, at least at the rear portion thereof. A small opening 42 is provided through the bottom wall 41. The partially enclosed space defined by the rear portion of the slot 18, the rear mounting block 28, and the bottom wall 41 is filled with a moldable rubber-like material 43 which thus surrounds and is in intimate engagement with the rear end region 44 of the elongated needle-carrying member 31.

A suitable moldable rubber-like material 43 is supplied in paste form and, when cured, becomes rubber-like. Usually, moisture is a major factor in the curing process. One such suitable moldable rubber-like material is a silicone composition sold by the Dow-Corning Company and known as "Silastic RTV 731 Silicone." Another suitable moldable rubber-like material having a silicone composition is sold by the General Electric Company and known as "RTV–102 Silicone Rubber Adhesive Sealant." These materials are moldable at room temperature, and do not have to be heated or melted.

A preferred method of the invention is as follows. After the needle-carrying member 31 and mounting blocks 23, 28 are assembled onto the body member 11, the front or crank end 33 of the member 31 might not always be in accurate alignment below and with respect to the gap formed by the pole pieces 16 and 17. This is due to normal variations in manufacturing tolerances of the parts involved. The member 31 is then accurately positioned by temporary means, such as by hand or by means of a jig or fixture, and the moldable rubber-like material is then squeezed or poured into the aforesaid space around the rear-end region 44 of the needle-carrying member 31. The opening 42 permits air to escape from the space during this step of the method. After the moldable rubber-like material has cured or set, the temporary positioning means is removed from the member 31, and the cured rubber-like material 43 thereafter resiliently maintains the member 31 in proper neutral position with the front end 33 thereof accurately aligned with respect to the pole pieces 16, 17. Alternatively, the bottom wall 41 may be eliminated, whereby the slot 18 will extend from top to bottom of the body member 11, in which event a bit more care must be exercised in filling the space with the material 43, or else a member must be temporarily placed at or over the bottom of this space to aid in positioning the material 43.

In operation, the engagement of the needle 34 with a groove of a phonograph record causes the front end 33 of the member 31 to vibrate in various directions, with respect to the pole pieces 16, 17, and in a plane perpendicular to the axis of the needle-carrying member 31. The molded rubber-like material 43 insures that the vibrating armature will vibrate about an accurately located neutral position symmetrically centered below the pole pieces 16 and 17.

The present invention simplifies the manufacturing of the phonograph stylus assembly and assures a uniformly good product, because it provides for accurate positioning of the needle-carrying member. The invention also provides greater restoring power for quickly restoring the needle-carrying member to its neutral position after each series of vibrations thereof. Thus, the operation is improved, and operational life is increased.

The preferred embodiment of the invention, as disclosed above, supports a needle-carrying member by means of a moldable rubber-like material in combination with one or more resilient damping blocks, and one of the damping blocks aids in forming a molding well for the rubber-like material.

Although shown and described as applied to a magnetic type of stylus assembly, the invention is not limited to this type of stylus assembly.

While a preferred embodiment of the invention has been shown and described, other embodiments and modifications thereof will be apparent to those skilled in the art, and will fall within the scope of invention as defined in the following claims.

What I claim is:

1. A method for accurately mounting a phonograph needle-carrying member to a body member, comprising the steps of assembling said needle-carrying member to said body member for support by said body member, temporarily positioning said needle-carrying member in accurate relationship with respect to said body member, applying a moldable rubber-like material between said needle-carrying member and said body member and in intimate engagement with said needle-carrying member, curing said moldable rubber-like material, and discontinuing said temporary positioning of the needle-carrying member, with said rubber-like material resiliently maintaining said needle-carrying member in accurate relationship with said body member.

2. A stylus assembly comprising a rigid body member having a slot therein, a resilient mounting block positioned in said slot and extending thereacross, said mounting block and a portion of said slot defining a partially enclosed space, an elongated needle-carrying member at least partially located in said slot and extending through said mounting block into said space, said member being at least partially supported by said block, and a mass of moldable rubber-like material positioned in and substantially filling said space, said moldable material engaging said body member and engulfing a portion of the needle-carrying member that extends into said space, thereby to provide a resilient supplementary support for accurately positioning and maintaining said needle-carrying member in said slot.

3. A stylus assembly comprising a rigid body member provided with an elongated slot therein, front and rear mounting blocks of resilient material positioned in said slot, said blocks each extending across said slot and being in parallel relationship with each other, said rear mounting block and a rear portion of said slot defining a partially enclosed space, an elongated needle-carrying member at least partially located in said slot and extending through each of said mounting blocks, said member having an end extending into said space, and a mass of moldable rubber-like material positioned in and substantially filling said space, said moldable material engaging said body member and surrounding the end of the needle-carrying member that extends into said space, thereby providing a resilient supplementary support for accurately positioning and maintaining said elongated member in said slot.

References Cited by the Examiner

UNITED STATES PATENTS

| | | | |
|---|---|---|---|
| 3,062,925 | 11/1962 | Pritchard | 274—37 X |
| 3,088,743 | 5/1963 | Di Mattia et al. | 274—37 X |

NORTON ANSHER, *Primary Examiner.*